(12) United States Patent
Volfson

(10) Patent No.: US 10,067,410 B2
(45) Date of Patent: Sep. 4, 2018

(54) MOUNTABLE, AFOCAL ADAPTOR FOR A CAMERA

(71) Applicant: Torrey Pines Logic, Inc., San Diego, CA (US)

(72) Inventor: Leo Volfson, San Diego, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 64 days.

(21) Appl. No.: 15/463,814

(22) Filed: Mar. 20, 2017

(65) Prior Publication Data

US 2017/0255085 A1    Sep. 7, 2017

Related U.S. Application Data

(63) Continuation of application No. 14/791,954, filed on Jul. 6, 2015, now Pat. No. 9,599,877, which is a
(Continued)

(51) Int. Cl.
*H04N 5/225*    (2006.01)
*G02B 7/02*    (2006.01)
(Continued)

(52) U.S. Cl.
CPC ......... *G03B 17/565* (2013.01); *G03B 17/566* (2013.01); *H04N 5/2252* (2013.01);
(Continued)

(58) Field of Classification Search
CPC .............................. G03B 17/15; G03B 17/565
See application file for complete search history.

(56) References Cited

U.S. PATENT DOCUMENTS 8,063,353 B2 * 11/2011 Veit .................. F16P 3/144
250/208.1
9,038,305 B2    5/2015 Volfson
(Continued)

OTHER PUBLICATIONS

Havlik, Dan; "The Camera Bag: Novo camera is a GoPro Hero3 hacked to take cinema lenses"; http://www.imaging-resource.com/news/2013/04/12/the-camera-bag-novo-camera-is-a-gopro-hero3-hacked-to-take-cinema-lenses; last visited Dec. 2, 2013; 4 pages.
(Continued)

*Primary Examiner* — Noam Reisner
(74) *Attorney, Agent, or Firm* — Fish & Richardson P.C.

(57) ABSTRACT

In some implementations a mountable afocal adaptor for a camera includes an attachment plate affixed to the front of a camera housing of a camera and an afocal optical module. The afocal optical module is configured to convert a received optical image to a converted optical image for use by the camera. The afocal adaptor also includes a rotation mechanism with a rotation ring and a wave spring clamp, the rotation ring affixed to the attachment plate and the wave spring clamp affixed to the afocal optical module. The rotation ring and wave spring clamp are mounted relative to each other to rotate around a rotational axis aligned with an axis of an optical path formed between the afocal optical module and the attachment plate and aligned with a view axis of the camera. The rotation mechanism also permits rotation of the camera housing around the rotational axis relative to the afocal optical module.

24 Claims, 11 Drawing Sheets

Related U.S. Application Data continuation of application No. 14/094,320, filed on Dec. 2, 2013, now Pat. No. 9,179,054.

(51) Int. Cl.
 *G02B 7/14* (2006.01)
 *G03B 17/56* (2006.01)

(52) U.S. Cl.
 CPC .......... *H04N 5/2254* (2013.01); *G02B 7/026* (2013.01); *G02B 7/14* (2013.01)

(56) References Cited

U.S. PATENT DOCUMENTS

| | | | | |
|---|---|---|---|---|
| 2004/0150899 | A1* | 8/2004 | Barziza | G03B 17/48 |
| | | | | 359/822 |
| 2005/0036782 | A1* | 2/2005 | Claudi | G02B 23/16 |
| | | | | 396/428 |
| 2008/0152337 | A1* | 6/2008 | Gartner | G02B 21/362 |
| | | | | 396/428 |
| 2014/0324348 | A1 | 10/2014 | Volfson | |
| 2015/0008260 | A1 | 1/2015 | Volfson | |
| 2015/0060652 | A1 | 3/2015 | Volfson | |
| 2015/0241760 | A1* | 8/2015 | Leblanc | G03B 15/03 |
| | | | | 396/428 |

OTHER PUBLICATIONS

DeRuvo, James; "GoPro Hero 3 Gets Third Party Mod to Take Lenses;" http://news.doddleme.com/equipment/gopro-hero-3-gets-third-party-mod-to-take-lenses; last visited Dec. 2, 2013; 6 pages.

Schreckengost, Tim; "Have a GoPro? Phone Skope has a setup for you!;" http://www.thermalbirding.com/2013/08/have-a-gopro-phone-skope-has-a-setup-for-you; last visited Dec. 2, 2013; 11 pages.

\* cited by examiner

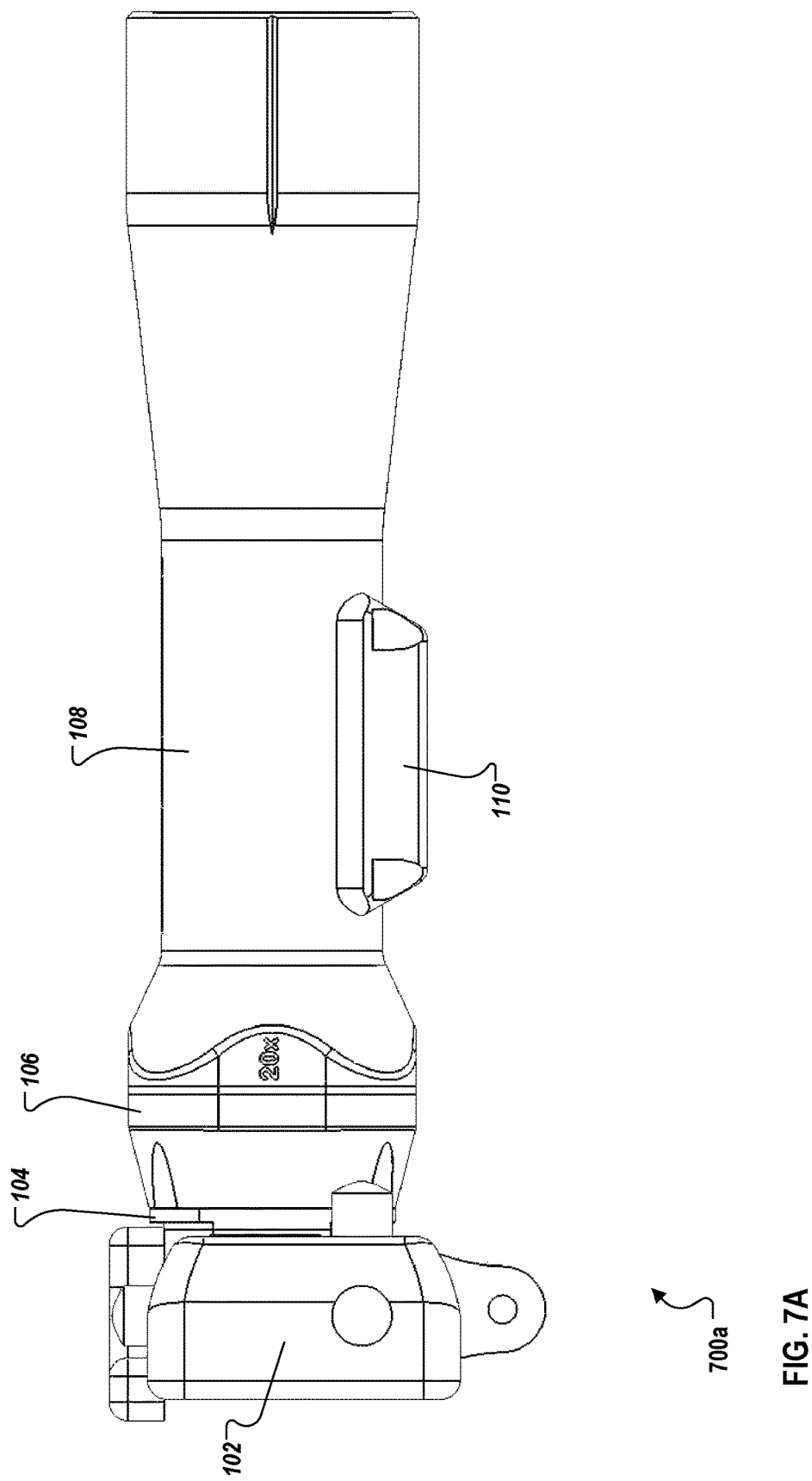

US 10,067,410 B2

MOUNTABLE, AFOCAL ADAPTOR FOR A CAMERA

CROSS-REFERENCE TO RELATED APPLICATION

This application is a continuation of U.S. patent application Ser. No. 14/791,954, entitled "Mountable, Afocal Adaptor for A Camera" filed on Jul. 6, 2015, which is a continuation of U.S. patent application Ser. No. 14/094,320 entitled "Mountable, Afocal Adapter for a Camera" filed on Dec. 2, 2013, the entire contents of which are hereby incorporated by reference for all purposes.

BACKGROUND

The disclosure relates to a mountable afocal adaptor for a camera. Recording or wirelessly transmitting image data, for example image data from long-range optical monitoring equipment such as firearm scopes and spotting scopes, typically requires an expensive custom camera solution. Custom camera solutions can be difficult to maintain and can quickly become technologically obsolete with advancements in camera technology. Additionally, custom camera solutions can be inflexible as to mounting options, for example on common accessory rails used on apparatuses such as firearms, tripods, camera stands, and other things. Attempting to mount a custom camera solution to, for example an accessory rail, can also result in, among other things, camera orientation problems and size issues for an intended purpose.

DESCRIPTION OF DRAWINGS

FIG. 7A is a right side view of the mountable afocal adaptor according to an implementation.

Like reference numbers and designations in the various drawings indicate like elements.

DETAILED DESCRIPTION

The disclosure relates to a mountable afocal adaptor for a camera The details of one or more implementations of the subject matter of this specification are set forth in the following description and the accompanying drawings to enable a person of ordinary skill in the art to practice the disclosed subject matter. Other features, aspects, and advantages of the subject matter will become apparent from the description, the drawings, and the claims. Various modifications, alterations, and permutations of the disclosed implementations can be made without departing from scope of the disclosure. Thus, the disclosure is not intended to be limited to the described and/or illustrated implementations, but is to be accorded the widest scope consistent with the principles and features disclosed herein.

An afocal system is formed by the combination of two optical focal systems. Described is a mountable afocal adaptor for a camera that allows for the use of the output of one optical focal system (afocal optical module) by the optical focal system of the camera. For example, the lens of the camera can be mounted in such a way to take the place of a human eye in relation to the eye piece of an afocal optical module, such as a firearm scope, spotting scope, telescope, and/or night-vision equipment. In the case where the camera is a similar to a GOPRO HERO-type camera with an input field-of-view of one-hundred thirty-five degrees and the afocal optical module is a firearm scope with a field-of-view output of 22 degrees and a certain eye relief, the afocal adaptor will convert the equivalent optical output of the firearm scope to be useable by the optical focal system of the camera.

Figure 1:
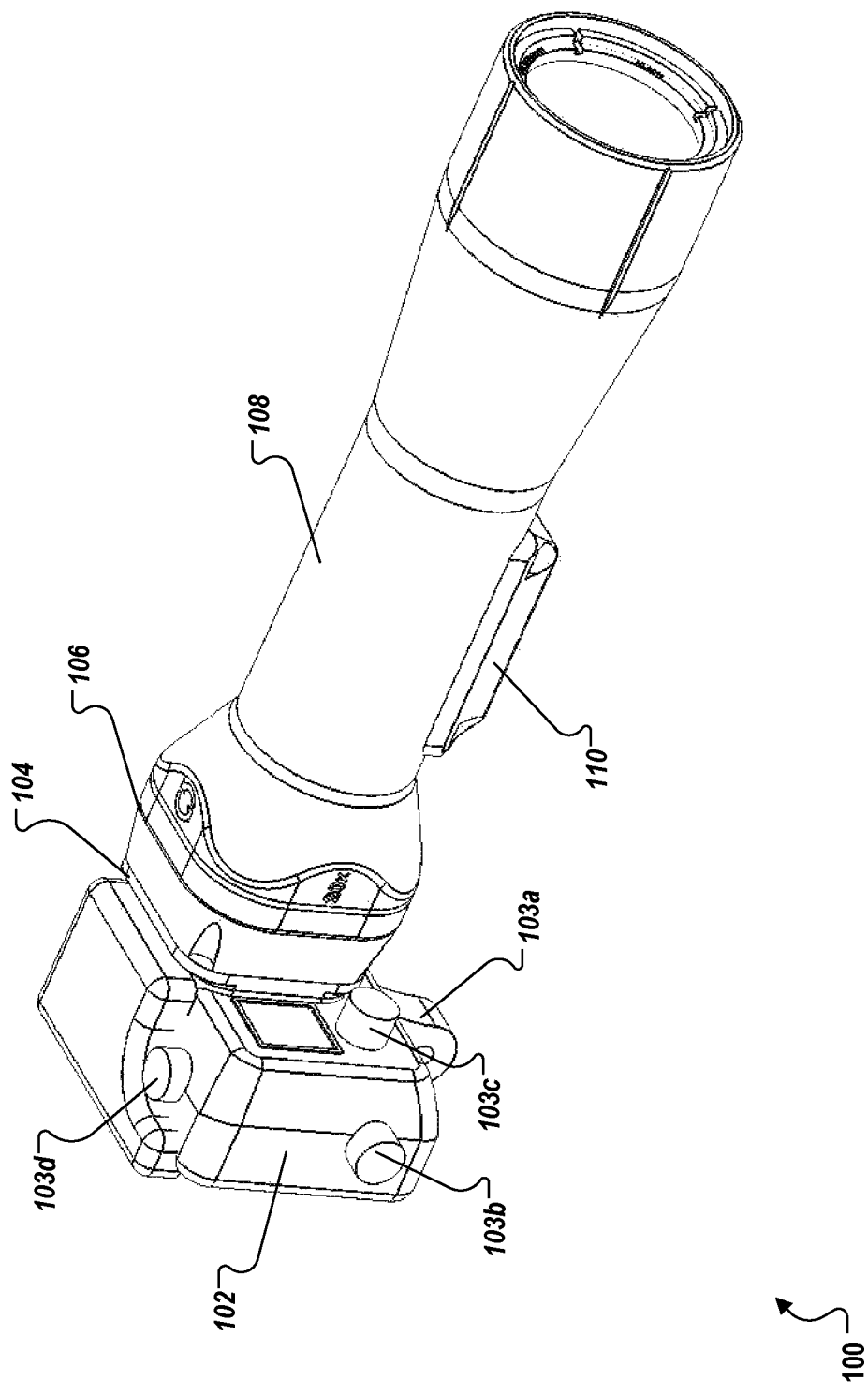
FIG. 1 is a perspective view of a mountable afocal adaptor for a camera ("afocal adaptor") according to an implementation.

FIG. 1 is a perspective view 100 of a mountable afocal adaptor for a camera ("afocal adaptor") according to an implementation. While the illustrated afocal adaptor is shown with particular markings (e.g., "20x" and double rotation arrow), any such markings are for illustrative purposes only and are not meant to limit the afocal adaptor in any way. In some implementations, the afocal adaptor 100 includes a camera housing 102, attachment plate 104, rotation mechanism 106, and afocal optical module 108. The afocal optical module 108 also is configured with a mounting mechanism 110 acting as an interface for mounting the afocal adaptor 100 onto a mounting apparatus, such as a firearm, a tripod, a fence, a building, or a vehicle. In some implementations, the mounting mechanism 110 can be for mounting the afocal adaptor 100 to a mounting structure/bracket such as a camera tripod bracket or an accessory rail. Accessory rails include WEAVER-, PICATINNY- (also known as a MIL-STD-1913, STANAG 2324, or "tactical") or other type rails. In other implementations, the mounting mechanism 110 can be configured to allow mounting of the afocal adaptor 110 to any other object, structure, and/or mechanism. In some implementations, the mounting mechanism 110 can be configured to be held by a human hand.

The camera housing 102 can be a primary housing configured to at least partially enclose inner components (e.g., lens assembly, electronics, battery, and the like) of an optical image device, such as a still-, digital-, video-, and/or other type of camera (hereinafter "camera"). In some implementations, the camera housing 102 can be a supplemental housing configured to enclose or semi-enclose and secure the camera (i.e., the primary housing and associated components of the camera). In some implementations, the camera housing 102 can have a hermetic seal to protect an enclosed camera from water, dirt, sand, and/or other substances. The camera housing 102 can also protect an enclosed camera from temperature fluctuations, physical shock, and the like. An example camera housing 102 can include a primary or supplemental housing used for the GOPRO HERO-type camera. Note that the illustrated camera housing 102 reflects a supplemental-type housing with other features, such as a mounting bracket 103a and control/access port covers (e.g., 103b-103d), that are not discussed in this specification. The camera housing 102 need not completely enclose the camera to be within the scope of this disclosure. Other camera-type housings are considered to be within the scope of this disclosure.

Figure 3:
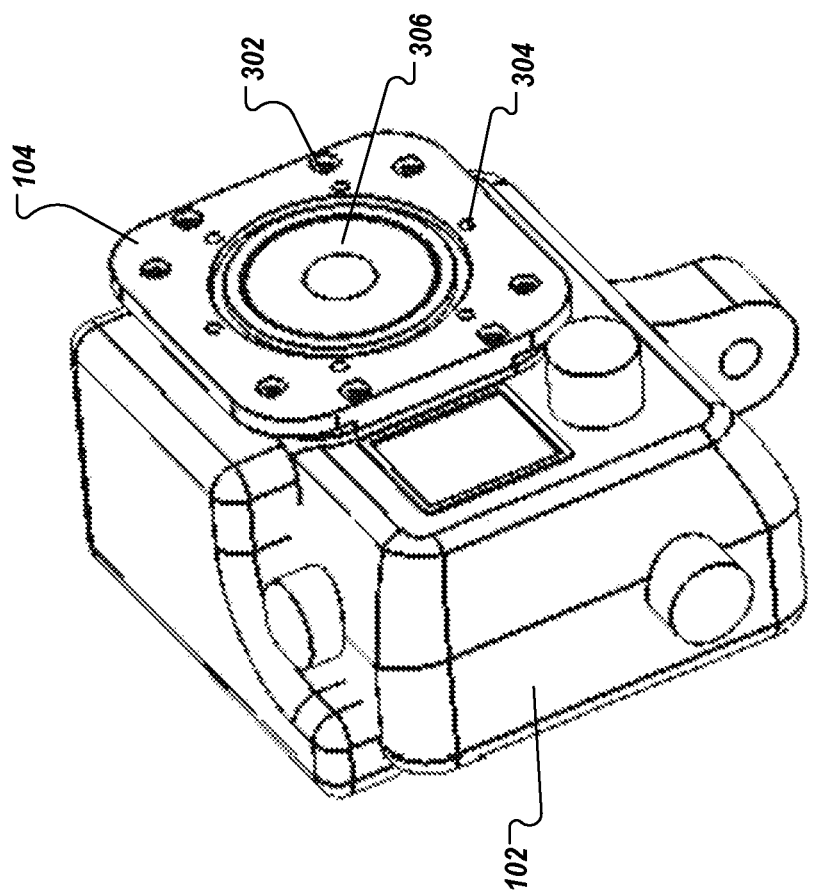
FIG. 3 is a perspective view of an attachment plate mounted to a camera housing according to an implementation.
Figure 4:
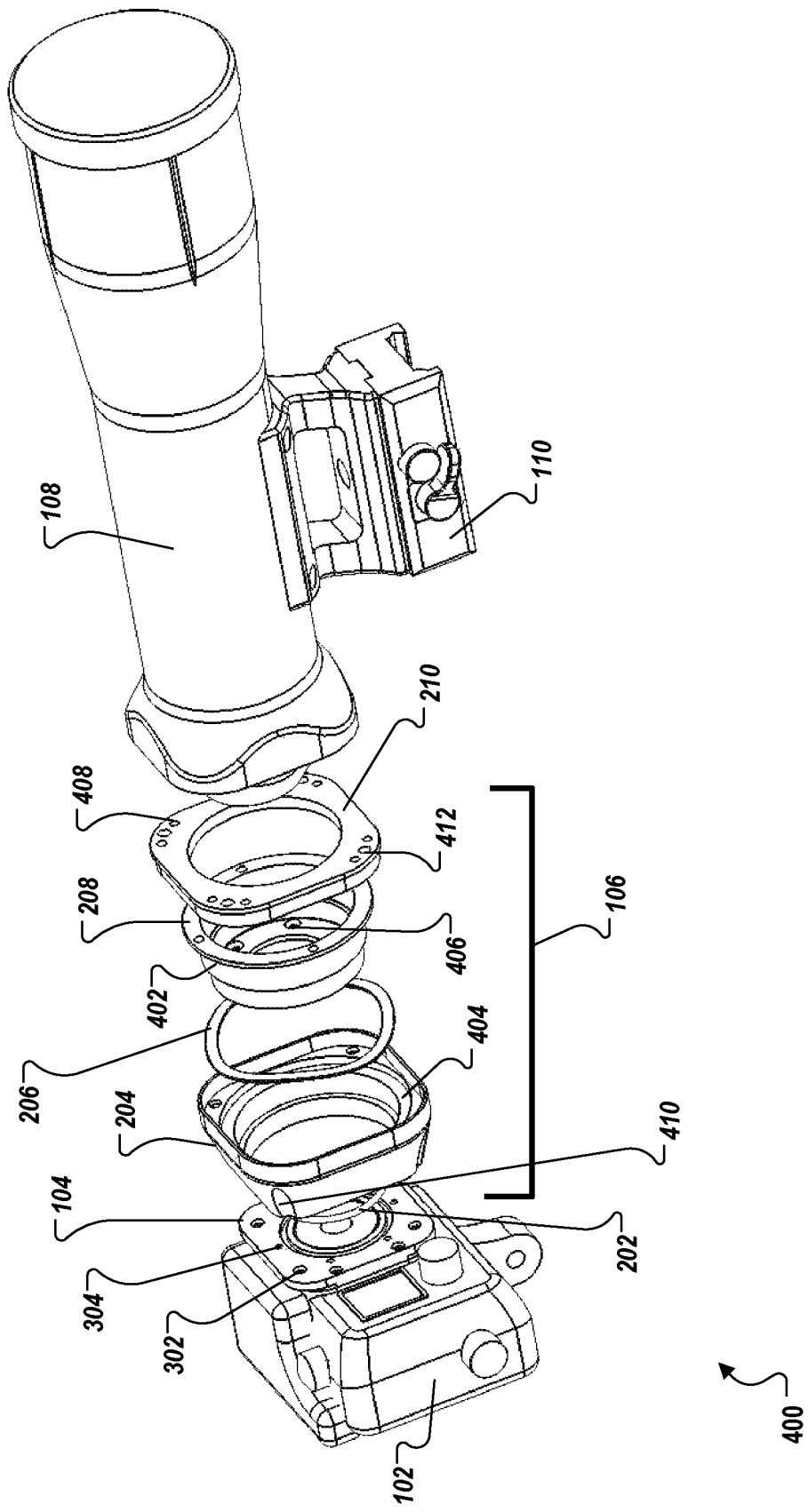
FIG. 4 is a front perspective view of the exploded view of the mountable afocal adaptor of FIG. 2.

The attachment plate 104 is a structure adapted to be secured to the camera housing 102 (either to a primary or supplemental housing). In typical implementations, the attachment plate 104 is secured to the camera housing 102 using a plurality of screw fasteners. In other implementations, the attachment plate 104 can be secured to the camera housing 102 using adhesives, clamps, or other securing method. The attachment plate 104 is configured to provide a precise and secure interface between the camera housing 102 and the rotation mechanism 106 and to provide an attachment point for the rotation mechanism 106. Refer to FIG. 3 and FIG. 4 for additional detail.

The rotation mechanism 106 is configured to provide a precise and secure optical/afocal and mechanical/rotational interface between the attachment plate 104 and the afocal optical module 108. The rotation point is at the interface between the attachment plate 104 and the rotation cover 204.

In some implementations, the rotation mechanism 106 is configured with an interlock assembly to allow the camera housing to be rotated in set angular increments, for example ninety-degree increments/"clicks" in either rotational direction. The rotation allows the afocal optical module 108 to be mounted at any angle to some mounting apparatus, for example a camera tripod, and for the camera housing 102 to be rotated so that the received image is recorded by a camera within the camera housing in a right-side-up aspect as opposed to a sideways or upside-down aspect. In some implementations, the rotation mechanism 106 can allow more precise rotation of the camera housing 102, for example, in single degrees or some other more granular degree increment.

In typical implementations, the afocal optical module 108 is a high-magnification optical device based on a NAGLER-type principle that reduces a received optical image from a greater field-of-view to a reduced field-of-view. For example, the afocal optical module 108 can reduce a received one-hundred thirty-five degree field-of-view to a four degree field-of-view while magnifying the image to between twenty and sixty times. These field-of-view/magnification values are for example purposes only and, as will be appreciated by those of skill in the art, the afocal-optic can be configured to perform a multitude of various optical conversions, magnifications, etc. depending upon a particular need/usage. In other implementations, the afocal optical module 108 can have other functionality. For example, the afocal optical module 108 can be a firearm scope, spotting scope, telescope, and/or night-vision equipment. As illustrated in FIG. 1, the afocal optical module 108 is stand-alone in that it incorporates all necessary conversion optics to convert a received optical image for use by a camera.

Figure 2:
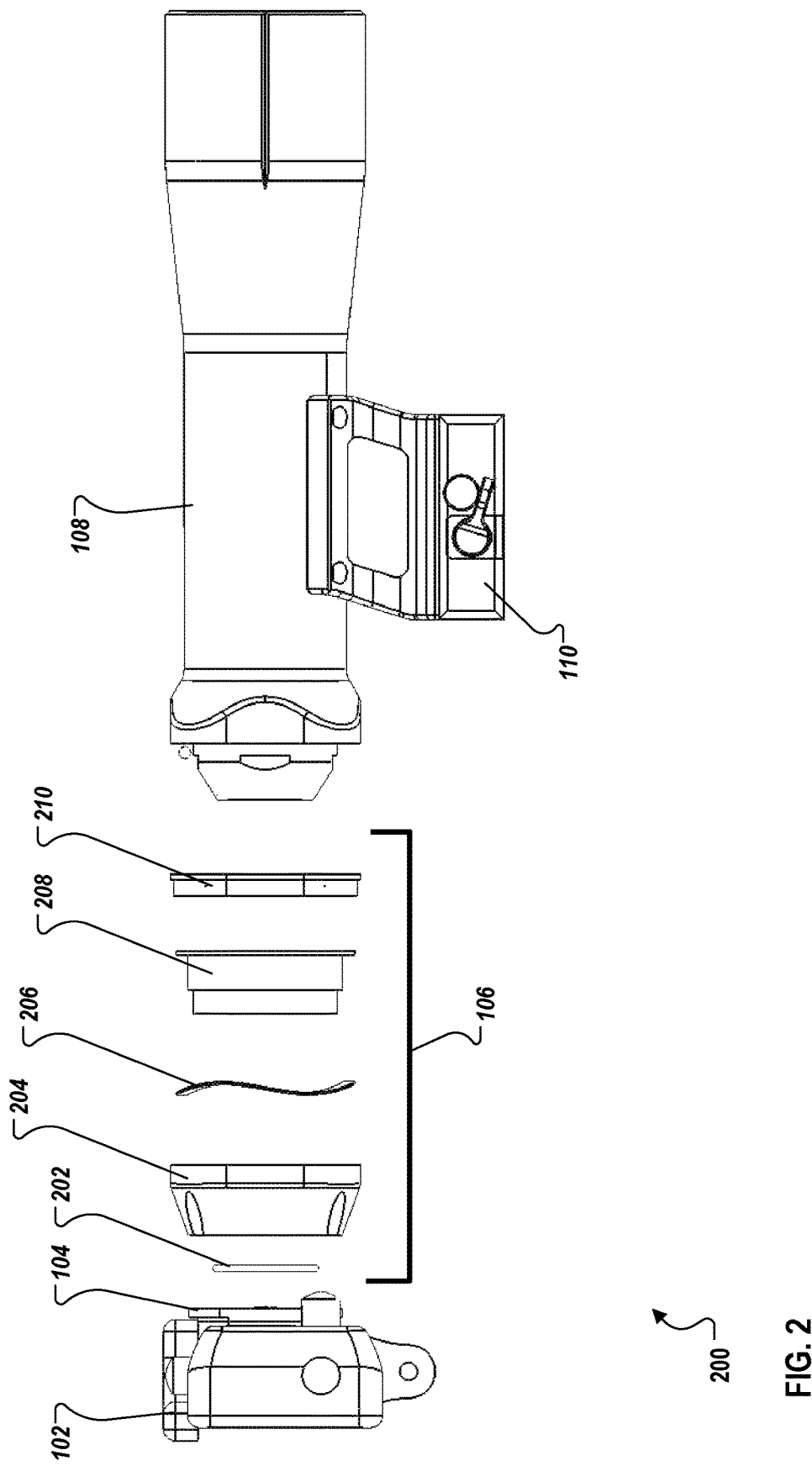
FIG. 2 is an exploded side view of the mountable afocal adaptor according to an implementation.

FIG. 2 is an exploded side view 200 of the mountable afocal adaptor according to an implementation. The exploded afocal adaptor 100 includes the camera housing 102, attachment plate 104, rotation mechanism 106, and afocal optical module 108. While the illustrated mounting mechanism 110 is illustrated in FIG. 2 as a quick-detach (QD) type, the mounting mechanism 110 can be any mechanism consistent with this disclosure to mount the afocal adaptor 100 to any other object, structure, and/or mechanism.

In FIG. 2, the rotation mechanism 106 has been exploded into constituent elements. Note that all elements of the rotation mechanism 106 are not necessarily illustrated. In some implementations, the rotation mechanism 106 includes an O-Ring 202, rotation cover 204, wave spring 206, rotation ring 208, and wave spring clamp 210. The described constituent parts of the rotation mechanism 106 are open in their interiors and form an optical path along an axis from the afocal optical module 108, through the rotation mechanism 106, and to the attachment plate 104. The wave spring 206 has a "wave" in the axial direction, which provides spring pressure when compressed—between the rotation cover 204 and the rotation ring 208—and places tension on the rotation ring 208 to increase the force necessary to rotate the rotation ring 208 on an axis corresponding to the above-described optical path.

FIG. 3 is a perspective view 400 of an attachment plate mounted to a camera housing 102 according to an implementation. In the illustrated implementation, the attachment plate 104 is secured to the camera housing 102 using a plurality of screw fasteners 302. Rotation ring screw holes 304 are used to secure the rotation ring 208 (not illustrated) to the attachment plate 104 (refer to FIGS. 4 and 5 for additional detail). In other implementations, the rotation ring 208 can attach directly to a primary-type camera housing 102 or to an attachment plate 104 affixed to the primary-type camera housing 102.

In some implementations, the attachment plate 104 surrounds an existing camera housing 102 optical aperture 306. In other implementations, the attachment plate 104 covers and protects an existing camera housing 102 optical aperture 306. In still other implementations, an existing camera housing 102 optical aperture 306 is removed and the attachment plate 104 affixed to the camera housing 102 to form an optical aperture 306. In some implementations, an O-Ring or other type of seal can be use between the camera housing 102 and the attachment plate 104 to form a seal between the camera housing 102 and the attachment plate 104.

FIG. 4 is a front perspective view 300 of the exploded view of the mountable afocal adaptor of FIG. 2. The rotation mechanism 106 defines and aligns an optical path between the attachment plate 104 and the afocal optical module 108. In some implementations, the illustrated afocal adaptor 100, is assembled as follows: 1) attachment plate 104 is affixed to the camera housing 102 using the screw-type fasteners 302; 2) wave spring 206 is slipped over the rotation ring 208 to rest against the inner surface (refer to FIG. 5 for additional detail) of a lip 402 configured on the surface of the rotation ring 208 adjacent to the wave spring clamp 210; 3) rotation ring 208 with installed wave spring 206 is inserted into the rotation cover 204. Wave spring 206 rests against inner surface 404 of the rotation cover 204; 4) O-ring 202 is placed between the surface of the rotation ring 208 adjacent to the attachment plate 104 and the attachment plate 104 to form a protective seal (e.g., water, dirt, dust, etc.); 5) rotation ring 208 is affixed to the attachment plate 104 using screw-type fasteners inserted through screw holes 406 and into screw holes 304 in the attachment plate; 6) wave spring clamp 210 is affixed to the afocal optical module 108 using two screw-type fasteners inserted through screw holes 408 from the interior at each corner of the wave spring clamp 210 and into corresponding screw holes (not illustrated—refer to FIG. 5 for additional detail) in the afocal optical module 108. In some implementations, an O-ring or other type seal (not illustrated) can be placed between the wave spring clamp 210 and the afocal optical module 108 to provide a protective seal (e.g., water, dirt, dust, etc.); 7)

wave spring clamp 210 is then affixed to the rotation housing 204 using one screw-type fastener inserted through screw holes 410 in the corners of the rotation housing 204 and into screw holes 412 in the corners of the wave spring clamp 210. In some implementations, the screws from the rotation housing 204 pass through the wave spring clamp 210 and into the afocal optical module 108 (refer to FIG. 5 for additional detail). In some implementations, an O-ring or other type seal can be installed between the rotation housing 204 and the wave spring clamp 210 to provide a protective seal (e.g., water, dirt, dust, etc.). Variations of the above-described assembly are considered to be within the scope of this disclosure.

Figure 5:
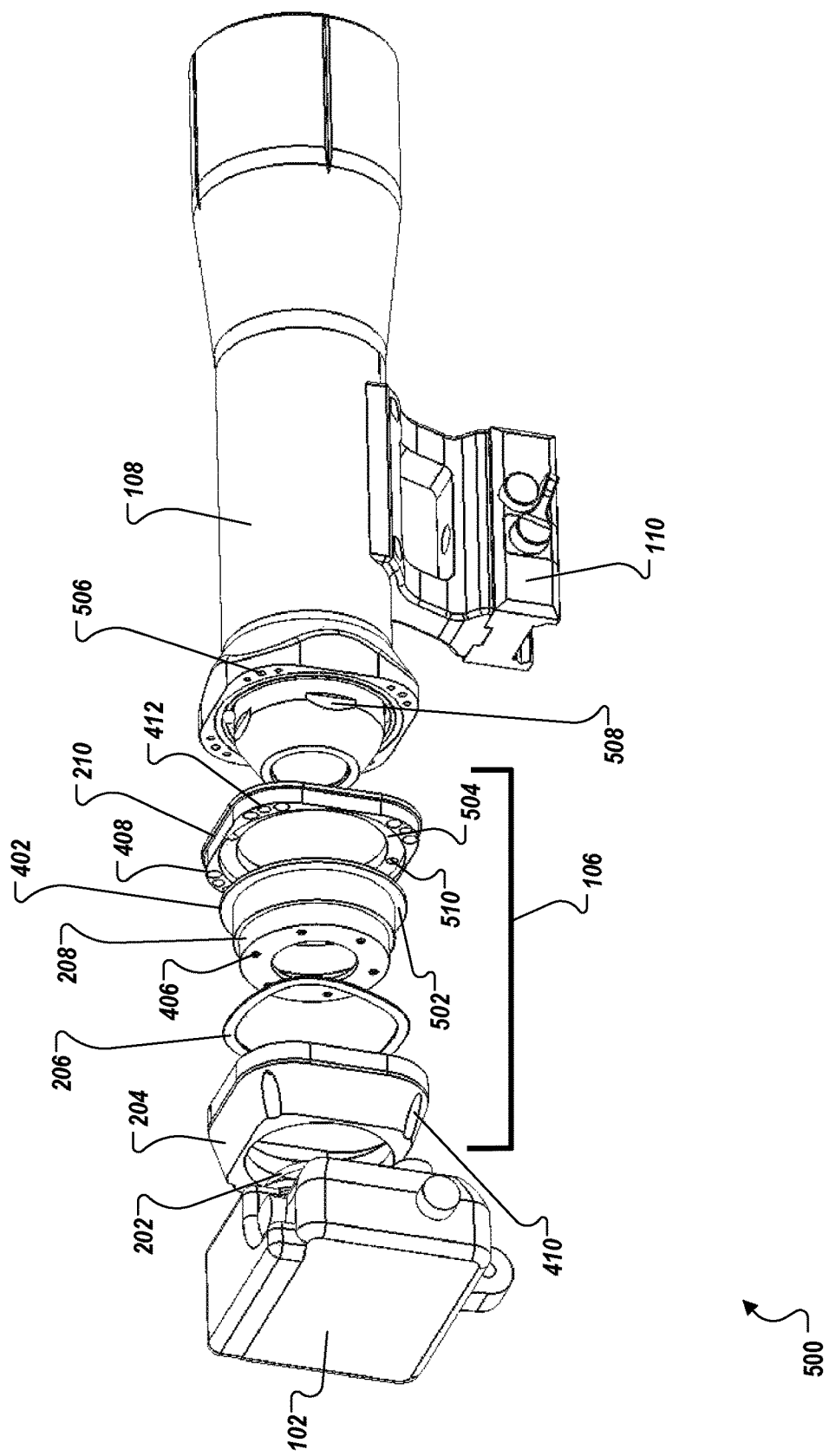
FIG. 5 is a rear perspective view of the exploded view of the mountable afocal adaptor of FIG. 2.

FIG. 5 is a rear perspective view 500 of the exploded view of the mountable afocal adaptor of FIG. 2. Inner surface 502 of lip 402 is illustrated. Wave spring 206 rests against surface 502 when installed over rotation ring 208. Lip 402 rests against the inner surface 504 of wave spring clamp 210.

Screw holes 506 are illustrated in the afocal optical module 108. As described above, the screw holes 506 are used to affix the wave spring clamp 210 to the afocal optical module 108 and, in some implementations, to affix the rotation housing 204 to the wave spring clamp 210. In some implementations, the afocal optical module 108 assembly can be configured with guide notches/cutouts 508 that can engage with the interior surface of the wave spring clamp 210 or with structures (not illustrated) formed into the interior edges of the wave spring clamp 210 to provide additional stability and/or anti-rotation support to the engagement of the wave spring clamp 210 and the afocal optical module 108.

As mentioned above with respect to FIG. 1, the rotation mechanism 106 can be configured with an interlock mechanism to allow the camera housing to be rotated in set angular increments, for example ninety-degree increments/"clicks" in either rotational direction. In this implementation, the interior surface of the wave spring clamp 210 can be configured as an interlock surface (e.g., protrusions, bumps, etc.) to function as an interlock detent engaging with an interlock engagement surface associated with the rotation ring 208. In some implementations, holes 510 can be formed into the inner surface 504 of the wave spring clamp 510. Interlock structures (not illustrated) (e.g., ball bearings or other structures) can be pressed into holes 510 forming the interlock surface. In some implementations, the interlock structures can be springily biased by springs (not illustrated) within holes 510 to extend outward from the wave spring clamp 210 in the direction of the rotation ring 208 interlock engagement surface (see below).

Figure 6:
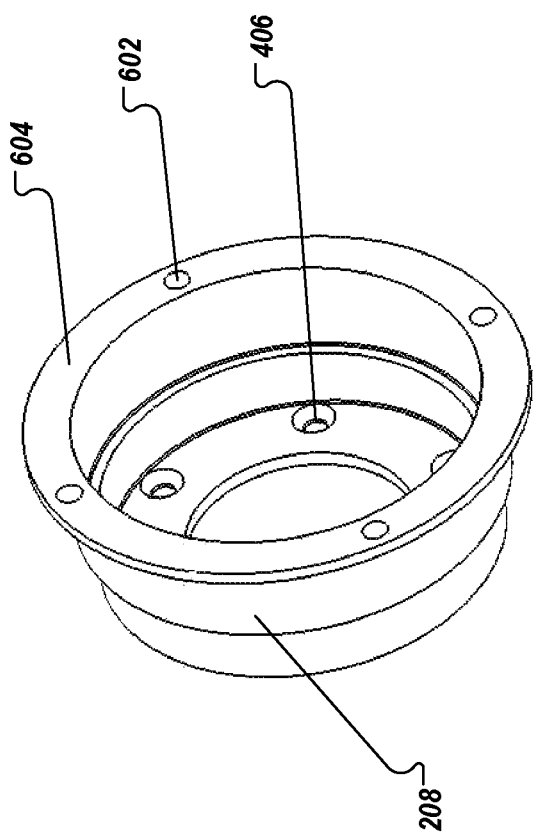
FIG. 6 is a front perspective view of a rotation ring of FIG. 4.
Figure 7B:
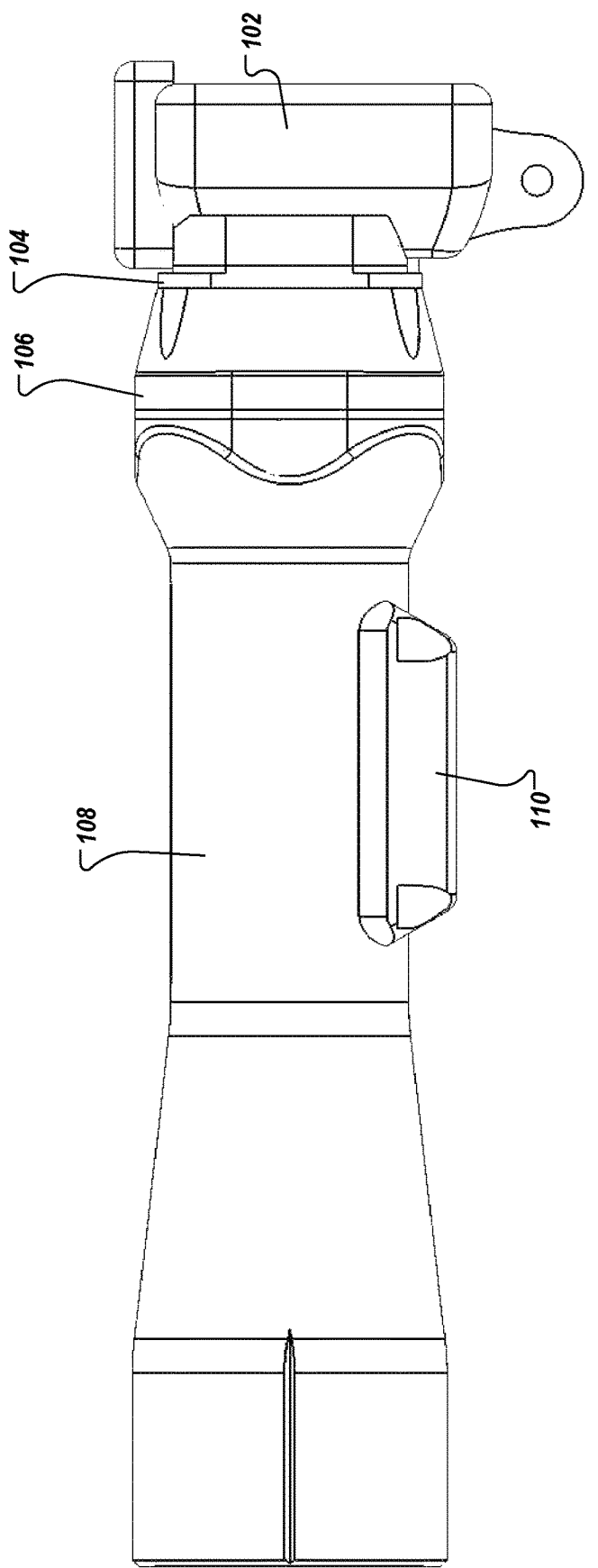
FIG. 7B is a left side view of the mountable afocal adaptor according to an implementation.
Figure 7C:
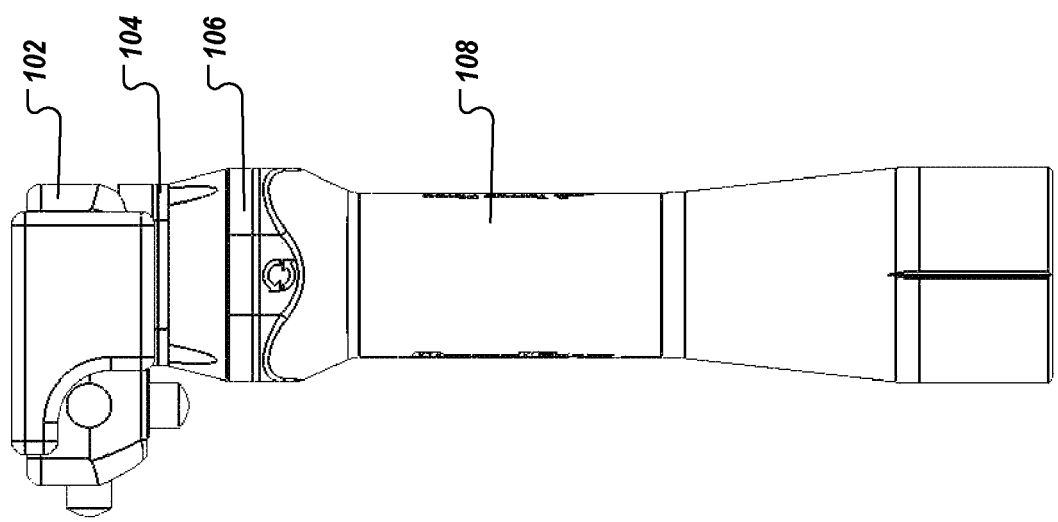
FIG. 7C is a top view of the mountable afocal adaptor according to an implementation.
Figure 7D:
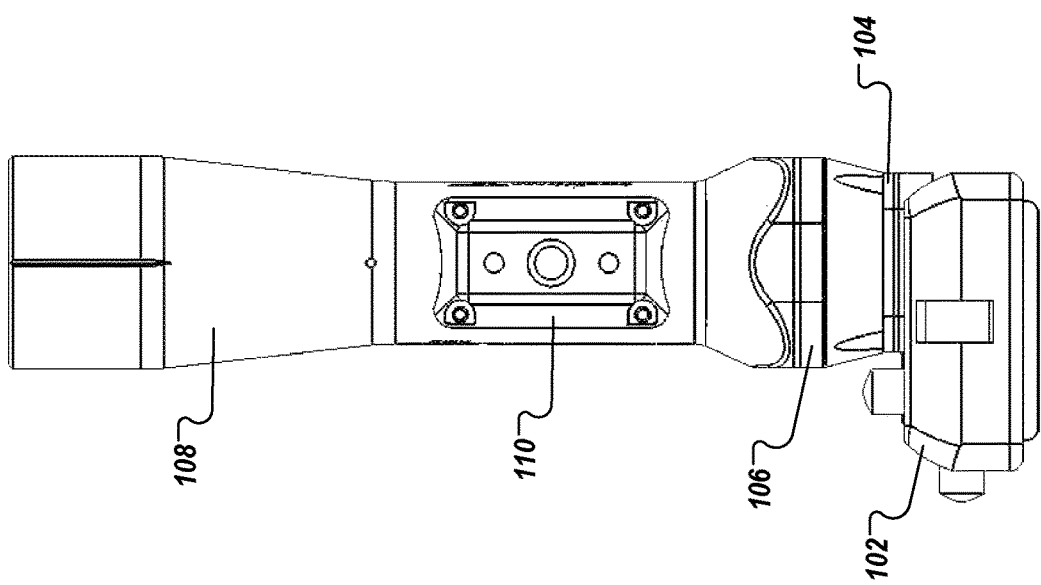
FIG. 7D is bottom view of the mountable afocal adaptor according to an implementation.

FIG. 6 is a front perspective view of a rotation ring of FIG. 4. In some implementations, the rotation ring 208 surface 604 can be configured with one or more holes 602 to form an interlock engagement surface. When the rotation ring 208 interlock engagement surface and the interlock surface of the wave spring clamp 210 are placed adjacent to each other, the interlock structures affixed to the wave spring clamp 210 engage with holes 602 when appropriately aligned to form an interlock mechanism. Spring pressure from the wave spring 206 springily biases the rotation ring 208 toward the wave spring clamp 210. The spring bias of the rotation ring 208 and engagement of the interlock structures with holes 602 of the rotation ring 208 "locks" the orientation of the rotation ring 208 (and camera housing 102) to the wave spring clamp 210 and restricts rotation of the camera housing 102. When the camera housing 102 is torqued either clockwise or counter-clockwise, sufficient torque will overcome the spring bias provided by the wave spring 206, the rotation ring 208 will move within the rotation housing 204 in the direction of the attachment plate 104 and the rotation ring 208 will disengage from the interlock structures affixed to wave spring clamp 210 The rotation ring 208 can be turned either clockwise or counter-clockwise until the wave spring clamp 210 interlock structures engage with the rotation ring 208 interlock engagement surface. In an alternate implementation, the wave spring ring 208 is configured with interlock structures similar to the wave spring clamp 210 while the wave spring clamp 210 is configured with the interlock engagement surface. FIGS. 7A-7D are various views of the afocal adaptor 100 according to the implementation of FIG. 1. FIG. 7A is a right side view 700a of the mountable afocal adaptor 100 according to an implementation. FIG. 7B is a left side view 700b of the mountable afocal adaptor 100 according to an implementation. FIG. 7C is a top view 700c of the mountable afocal adaptor 100 according to an implementation. FIG. 7D is bottom view 700d of the mountable afocal adaptor 100 according to an implementation.

Figure 8:
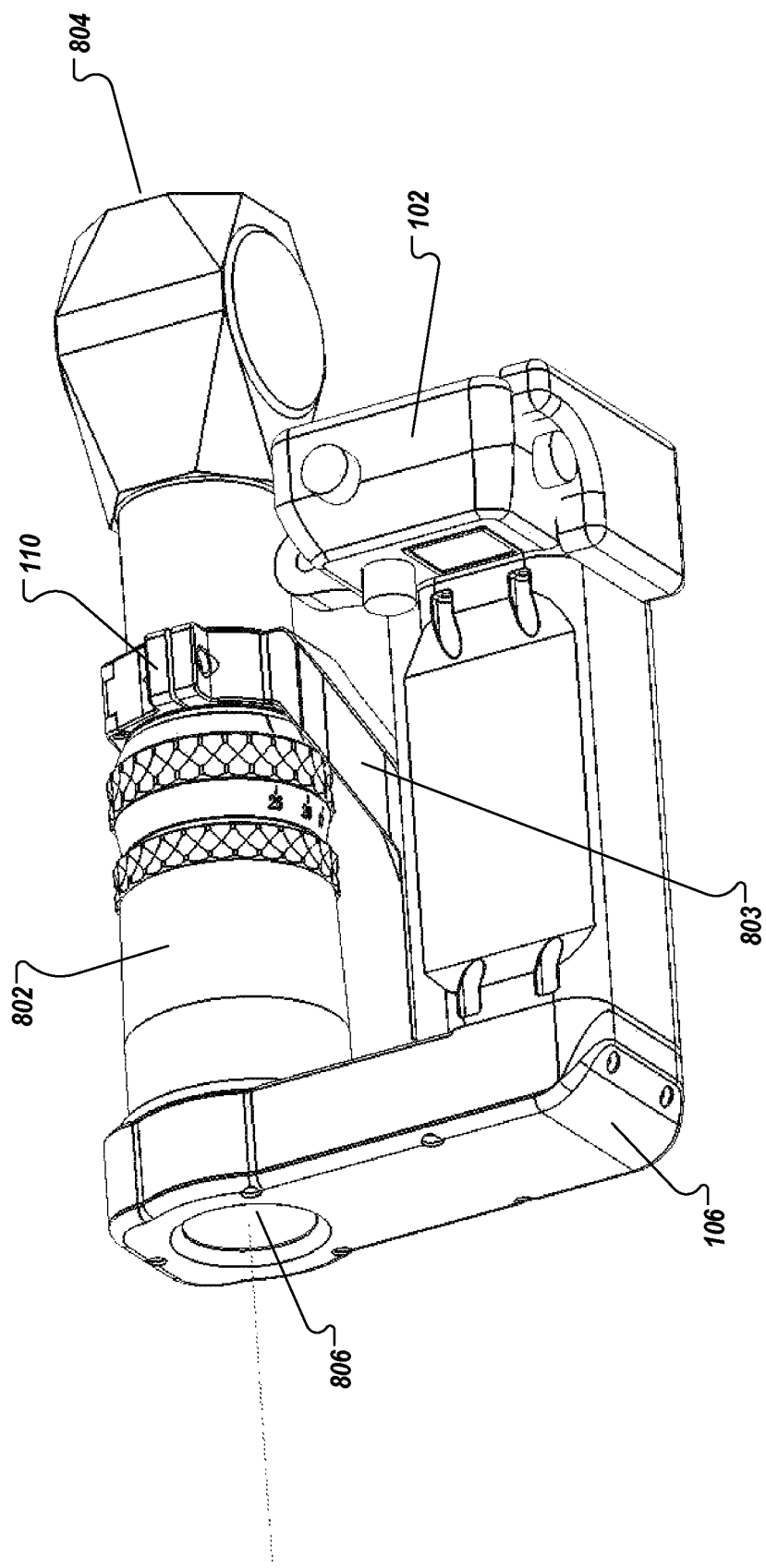
FIG. 8 is a perspective view of an alternate configuration of a mountable afocal adaptor according to an implementation.

FIG. 8 is a perspective view 800 of an alternate configuration of a mountable afocal adaptor according to an implementation. As illustrated in FIG. 8, the afocal optical module is not stand-alone (as compared to the afocal optical module of FIG. 1) and is formed of a combination of a rotation mechanism 106 including, among other things, optical redirection-type optics (e.g., prisms and/or mirrors), coupled with an optical device 802, for example a firearm scope, spotting scope, telescope, and/or night-vision equipment. The rotation mechanism 106 can be affixed to the optical device 802 in any appropriate manner, for example using screw-type threads, friction fit, clamps, or other fastening methods capable of maintaining a secure optical alignment between the rotation mechanism 106 and the optical device 802. In some implementations, a stability arm 803 can be configured to couple to the optical device 802 and/or the mounting mechanism 110 to provide additional optical and/or mechanical stability to the configuration.

In the illustrated configuration, an optical image is received at 804, optically modified by the optical device 802 (e.g., magnified, reduced, etc.), and output at 806. The illustrated rotation mechanism 106 is configured with a ninety-degree angle to bend and redirect an optical image to the camera housing 102. In some implementations, the optical image redirection is accomplished by use of a series of prisms, mirrors, and/or lenses to mirror the optical output at 806 for use by a camera in camera housing 102. For example, in some implementations, the rotation mechanism 106 can include two prisms—one acting as an erector and the second acting to flip an image from left to right considering the backwards mounting orientation of the camera housing 102. Those of ordinary skill in the art will appreciate that many different configurations of the above-describe components can be constructed to perform functions consistent with this disclosure. Other configurations of mountable afocal adaptors consistent with the specification are considered to be within the scope of specification.

In an alternate implementation, the mountable afocal adaptor can be configured to act as a lens attachment for a camera secured by the camera housing 102. In this implementation, the lens assembly in the camera is partially or wholly removed and a desired partial or whole lens assembly is mounted to the rotation mechanism 106 to provide appropriate lens assembly functionality for the camera.

What is claimed is:

1. A mountable afocal adaptor for a camera, comprising:
an attachment plate that contacts the front of a camera housing of a camera;
an afocal optical module configured to convert a received optical image to a converted optical image for use by the camera; and
a rotation mechanism comprising a rotation ring and a wave spring clamp, wherein the rotation ring contacts the attachment plate and the wave spring clamp, wherein the wave spring clamp contacts the afocal optical module, and wherein rotation ring and attachment plate rotate together relative to the wave spring clamp around a rotational axis aligned with an axis of an optical path formed between the afocal optical module and the attachment plate, wherein the converted optical image is output both through the rotation mechanism along the rotational axis and to the camera housing as a redirected optical image, wherein the rotation mechanism is configured with a ninety-degree angle bend that redirects and aligns the converted optical image to the camera housing attached to the rotation mechanism after the ninety-degree angle bend.

2. The afocal adaptor of claim 1, comprising a mounting mechanism configured as part of the afocal optical module.

3. The afocal adaptor of claim 1, wherein the camera is one of a still-, digital-, or video-type camera.

4. The afocal adaptor of claim 1, wherein the rotation mechanism comprises:
a rotation cover; and
a wave spring that contacts the rotation cover and the rotation ring and springily biases the rotation ring toward and in contact with the wave spring clamp.

5. The afocal adaptor of claim 4, wherein the rotation ring contacts the attachment plate through the rotation cover.

6. The afocal adaptor of claim 4, wherein the rotation cover contacts the wave spring clamp and captures the wave spring and rotation ring.

7. The afocal adaptor of claim 1, comprising an interlock configured to permit incremental rotation of the rotation mechanism on the rotational axis.

8. The afocal adaptor of claim 1, wherein the afocal optical module is configured with guides that interface with an adjacent surface of the wave spring clamp to provide anti-rotation support associated with the contact of the wave spring clamp with the afocal optical module.

9. The afocal adaptor of claim 1, wherein the afocal optical module is configured to magnify and reduce a received optical image field-of-view into a reduced optical image field-of-view for use by the camera.

10. The afocal adaptor of claim 1, wherein the camera housing is a primary housing.

11. A mountable afocal adaptor for a camera having a rotation mechanism comprising a rotation ring and a wave spring clamp, wherein the rotation ring contacts an attachment plate that contacts the front of a camera housing of a camera and the wave spring clamp, wherein the wave spring clamp contacts an afocal optical module, and wherein the rotation ring and the attachment plate rotate together relative to the wave spring clamp around a rotational axis aligned with an axis of an optical path formed between the afocal optical module and the attachment plate, wherein an optical image is output both through the rotation mechanism along the rotational axis and to the camera housing as a redirected optical image, wherein the rotation mechanism is configured with a ninety-degree angle bend that redirects and aligns the received optical image to the camera housing attached to the rotation mechanism after the ninety-degree angle bend.

12. The afocal adaptor of claim 11, wherein the afocal optical module is configured with guides that interface with an adjacent surface of the wave spring clamp to provide anti-rotation support associated with the contact of the wave spring clamp with the afocal optical module.

13. The afocal adaptor of claim 11, wherein the rotation mechanism comprises:
a rotation cover; and
a wave spring that contacts the rotation cover and the rotation ring and springily biases the rotation ring toward and in contact with the wave spring clamp.

14. The afocal adaptor of claim 11 having an interlock configured to permit incremental rotation of the rotation mechanism on the rotational axis.

15. The afocal adaptor of claim 11, wherein the afocal optical module transmits a magnified and reduced field-of-view for the optical image along the optical path.

16. A method for providing a mountable afocal adaptor for a camera, comprising:
recording an optical image received by an afocal optical module, the optical image recorded in a first orientation when a rotation mechanism is rotated into a first position, the rotation mechanism of the afocal optical module comprising a rotation cover, rotation ring, and a wave spring clamp, wherein the rotation ring contacts the wave spring clamp and an attachment plate that contacts the front of a camera housing of a camera, wherein the wave spring clamp contacts the afocal optical module, and wherein the rotation ring and attachment plate rotate together relative to the wave spring clamp around a rotational axis aligned with an axis of an optical path formed between the afocal optical module and the attachment plate, wherein the optical image is output both through the rotation mechanism along the rotational axis and to the camera housing as a redirected optical image, wherein the rotation mechanism is configured with a ninety-degree angle bend that redirects and aligns the received optical image to the camera housing attached to the rotation mechanism after the ninety-degree angle bend; and
recording an optical image in a second orientation when the rotation mechanism is rotated into a second position.

17. The method of claim 16, comprising restricting rotation of the rotation mechanism between the first orientation and the second orientation according to a set angular increment on the rotational axis using an interlock.

18. The method of claim 16, comprising receiving the optical image from the afocal optical module, the optical image magnified and reduced in field-of-view in comparison to the optical image received by the afocal optical module.

19. The method of claim 16, comprising rotating the rotation mechanism according to a set angular increment on the rotational axis.

20. The method of claim 16, comprising mounting the afocal optical module to an accessory rail using a mounting mechanism configured as part of the afocal optical module.

21. The method of claim 16, wherein the rotation ring is springily biased toward and in contact with the wave spring clamp by a wave spring contacting the rotation cover and the rotation ring.

22. The afocal adaptor of claim 1, comprising an O-ring placed between contacting surfaces of the rotation ring and the attachment plate to form a protective seal.

23. The afocal adaptor of claim 1, comprising an O-ring placed between contacting surfaces of the wave spring clamp and the rotation cover to form a protective seal.

24. The afocal adaptor of claim 1, comprising an O-ring placed between contacting surfaces of the wave spring clamp and the afocal optical module to form a protective seal.

* * * * *